(12) United States Patent
Kasuga et al.

(10) Patent No.: US 8,014,127 B2
(45) Date of Patent: Sep. 6, 2011

(54) SOLID ELECTROLYTIC CAPACITOR

(75) Inventors: Takeo Kasuga, Sendai (JP); Takashi Mizukoshi, Sendai (JP); Koji Sakata, Sendai (JP); Takeshi Saito, Sendai (JP)

(73) Assignee: NEC Tokin Corporation, Sendai-Shi (JP)

( * ) Notice: Subject to any disclaimer, the term of this patent is extended or adjusted under 35 U.S.C. 154(b) by 385 days.

(21) Appl. No.: 12/370,748

(22) Filed: Feb. 13, 2009

(65) Prior Publication Data

US 2009/0201631 A1    Aug. 13, 2009

(30) Foreign Application Priority Data

Feb. 13, 2008   (JP) ................ 2008-031570

(51) Int. Cl.
*H01G 9/00*   (2006.01)

(52) U.S. Cl. ........ 361/523; 361/516; 361/519; 361/525; 361/528; 361/535; 29/25.01; 29/25.03

(58) Field of Classification Search ................ 361/523, 361/525, 516–519, 528–529, 535, 540–541; 29/25.01, 25.03

See application file for complete search history.

(56) References Cited

U.S. PATENT DOCUMENTS

| | | | | |
|---|---|---|---|---|
| 6,361,572 B1 * | 3/2002 | Igaki et al. | ...... | 29/25.03 |
| 6,501,640 B1 * | 12/2002 | Niiori et al. | ...... | 361/504 |
| 6,914,769 B2 * | 7/2005 | Welsch et al. | ...... | 361/508 |
| 7,061,749 B2 * | 6/2006 | Liu et al. | ...... | 361/502 |
| 7,609,505 B2 * | 10/2009 | Naito et al. | ...... | 361/523 |

FOREIGN PATENT DOCUMENTS

| | | |
|---|---|---|
| JP | 2001-57321 A | 2/2001 |
| JP | 2006-93343 A | 4/2006 |

* cited by examiner

*Primary Examiner* — Nguyen T Ha

(74) *Attorney, Agent, or Firm* — Holtz, Holtz, Goodman & Chick, PC

(57) ABSTRACT

In a solid electrolytic capacitor, a capacitor element laminate formed by stacking capacitor elements each using a valve metal as an anode body is bonded to a substrate by a conductive adhesive and packaged by a resin portion. The substrate includes a printed substrate made of an epoxy resin. On its mounting surface for the capacitor element laminate, there are provided an anode mounting portion and a cathode mounting portion each made of a copper base material. The anode mounting portion and the cathode mounting portion are electrically connected to an external anode terminal and an external cathode terminal, respectively, formed on the mounting surface of the solid electrolytic capacitor, through anode vias and cathode vias each penetrating through the epoxy resin. A part of the anode mounting portion on the substrate (6) extends to the outside of the packaging resin portion.

12 Claims, 5 Drawing Sheets

SOLID ELECTROLYTIC CAPACITOR

This application is based on and claims the benefit of priority from Japanese Patent Application No. 2008-31570, filed on Feb. 13, 2008, the disclosure of which is incorporated herein in its entirety by reference.

BACKGROUND OF THE INVENTION

1. Field of the Invention

This invention relates to a solid electrolytic capacitor comprising a substrate and a capacitor element and, in particular, relates to a solid electrolytic capacitor packaged with a resin.

2. Description of the Related Art

Many solid electrolytic capacitors have a structure in which a solid electrolytic capacitor element is covered with a packaging resin and an anode and a cathode of the capacitor element are electrically connected to an anode terminal and a cathode terminal, respectively, provided outside the packaging resin. The packaging resin serves to maintain airtightness of the inside of the element and to electrically and mechanically protect the element itself.

As one example of such a capacitor structure, there is one in which a capacitor element is mounted on a substrate and covered with a packaging resin and an anode terminal and a cathode terminal are provided on the back side of the substrate to serve as mounting terminals. Japanese Unexamined Patent Application Publication (JP-A) No. 2006-93343 (Patent Document 1), for example, discloses this type of solid electrolytic capacitor. In Patent Document 1, a laminate of capacitor elements is used. This solid electrolytic capacitor is fabricated in the following manner. A dielectric oxide film layer is formed at the surfaces of each of valve metal bases and a solid electrolyte layer and a conductor layer are laminated on the surfaces of a region, excluding a capacitor element anode portion, of each valve metal base formed with the dielectric oxide film layer. The laminated solid electrolyte layer and conductor layer serve as a capacitor element cathode portion. Thereafter, in the state where the capacitor element anode portions are aligned together, the capacitor element cathode portions are bonded together using a conductive adhesive, so that a capacitor element laminate is formed. Then, a capacitor element laminate anode portion is bonded to the surface of an anode pattern of a substrate, being a member to be connected, by, for example, YAG laser welding, while, a capacitor element laminate cathode portion is bonded to the surface of a cathode pattern of the substrate by a conductive adhesive. Thereafter, the laminate fixed to the substrate at its predetermined regions in the manner described above is overmolded with an epoxy resin by casting using a vacuum printing method. In the state where a mold surface of the thus overmolded substrate faces upward, dicing is performed at intervals of, for example, 7.3 mm×4.3 mm on the basis of predetermined marking positions. Then, aging treatment is carried out by applying a constant voltage to a solid electrolytic capacitor according to a known method to sufficiently reduce leakage current (referred to as LC), thereby completing the fabrication.

As another example of such a solid electrolytic capacitor having the structure in which a solid electrolytic capacitor element is covered with a packaging resin and an anode and a cathode of the capacitor element are electrically connected to an anode terminal and a cathode terminal, respectively, provided outside the packaging resin, there is a resin-packaged chip-type solid electrolytic capacitor. Japanese Unexamined Patent Application Publication (JP-A) No. 2001-57321 (Patent Document 2), for example, discloses this type of structure. This chip-type solid electrolytic capacitor is fabricated in the following manner. At first, a compact, having a rectangular parallelepiped shape or the like, of metal tantalum powder embedded with a tantalum wire to serve as an anode lead is sintered, thereby producing a porous anode body. Then, a dielectric oxide film layer is formed by anodic oxidation on the surfaces of the anode body other than the anode lead portion. A solid electrolyte layer and a conductor layer are laminated on the surfaces of the dielectric oxide film layer, thereby obtaining a capacitor element. Then, a flat plate-shaped anode terminal with a portion extending straight out of a packaging resin body (to be formed later) is connected to the anode lead by electric resistance welding, laser welding, or the like. Further, a flat plate-shaped cathode terminal with a portion extending straight out of the packaging resin body (to be formed later) is connected to the cathode conductor layer at the surface of the capacitor element by a conductive adhesive. Further, the anode terminal or the cathode terminal, or both the anode terminal and the cathode terminal are immersed in a mixture of a solvent and polytetrafluoroethylene, then drying is carried out to volatilize the solvent, thereby forming a porous fluororesin body. Thereafter, the packaging resin body covering a predetermined portion is formed by transfer molding using a thermosetting resin such as an epoxy resin. Finally, the portions, extending out of the packaging resin body, of the anode and cathode external terminals are each bent along a side surface of the packaging resin body and further bent along a bottom surface thereof, thereby completing the fabrication.

SUMMARY OF THE INVENTION

In the case of the conventional solid electrolytic capacitor disclosed in Patent Document 1, after the capacitor element laminate is bonded to the anode and cathode patterns of the substrate, the epoxy resin is overmolded thereon. Therefore, this solid electrolytic capacitor is sealed with no gap by the glass cloth-containing heat-resistant epoxy resin substrate and the packaging epoxy resin. Since the normal epoxy resin has very low water permeability, there is almost no invasion of moisture into the inside of the packaging resin. However, unless there is some moisture in the aging treatment performed under the application of the predetermined voltage, there is a possibility that the dielectric oxide film cannot be an insulating film in which a defective portion that may exist in the dielectric oxide film is mended. Consequently, the leakage current cannot be sufficiently reduced by the aging treatment in such an environment.

On the other hand, if the sealed capacitor element contains absorbed moisture, there is a possibility that a crack occurs at a portion of the packaging resin, where the thickness is small and thus the strength is low, due to an increase in internal pressure when mounting the solid electrolytic capacitor on a mounting board by reflow soldering, so that water vapor is ejected at a time to cause a position offset during the mounting.

In the case of the conventional chip-type solid electrolytic capacitor of Patent Document 2, vent paths for water vapor are secured by providing the porous fluororesin body at the anode or cathode lead or both the anode and cathode leads. This makes it possible to discharge, through the vent paths, water vapor generated by heat applied when mounting the capacitor and thus to prevent the position offset of the element. Patent Document 2 describes that although moisture tends to enter from the outside through the vent paths formed by the porosity, no particular side effects are caused by this. However, since it is difficult to adjust the shapes such as widths and lengths of the vent paths formed by the porous fluororesin body, there is considered to be a problem in terms of moisture resistance in mounting this type of capacitor to an electronic device such as a personal computer in which a large number of components are mounted at high density. In consideration of the influence on the conductivity of a solid electrolyte due to heat generated from a CPU (central processing unit), more circumspection should be exercised in mounting this type of capacitor to such a device.

It is therefore an object of this invention to provide a solid electrolytic capacitor improved in reliability at high temperature and in characteristics.

A solid electrolytic capacitor of this invention is a substrate-type capacitor in which a capacitor element is covered with a packaging resin, wherein the capacitor element comprises an anode portion formed by a partial region of a valve metal base and an oxide film, as a dielectric, at a surface formed by roughening a region other than the anode portion and an insulating band portion on the valve metal base and further comprises a conductive polymer layer and a conductor layer as a cathode portion on the dielectric, and a vent path for water vapor or a path for water molecules, entering from the outside, is secured between the packaging resin and a substrate.

The vent path for water vapor or the path for water molecules leads to the outside of the solid electrolytic capacitor from the substrate and the anode portion of the capacitor element. A capacitor element anode mounting portion formed on the substrate has at least one portion extending to an external end face of the packaging resin and exposed at the external end face thereof.

The vent path for water vapor or the path for water molecules may be formed so as to lead to the outside of the solid electrolytic capacitor from the substrate and the cathode portion of the capacitor element. A capacitor element cathode mounting portion formed on the substrate has at least one portion extending to an external end face of the packaging resin and exposed at the external end face thereof.

With the conventional solid electrolytic capacitor sealed with no gap by the substrate and the packaging epoxy resin, since the normal epoxy resin has very low water permeability, it has been difficult to allow the capacitor element to absorb moisture. By employing the structure of this invention, it becomes possible to allow water vapor to enter through a gap formed between the surface of a metal on the substrate and the packaging resin and to allow the capacitor element to absorb moisture. This gap includes a bonding state where the bonding strength at the interface between the metal surface and the resin is reduced so that the permeability of water molecules increases. By performing aging treatment with application of a constant voltage to the solid electrolytic capacitor according to the known method in the state where it is possible to allow water vapor to enter through the vent path and thus to allow the capacitor element to absorb moisture, it is possible to reduce leakage current (LC). This vent path for water vapor can be obtained by forming the capacitor element anode mounting portion, the capacitor element cathode mounting portion, or the capacitor element anode and cathode mounting portions in such a manner as to extend to the external end face or faces of the packaging resin.

According to this invention, it is possible to allow water vapor to enter between a substrate and a packaging resin and thus to allow a capacitor element to absorb moisture. This makes it possible to reduce LC by applying a constant voltage.

That is, according to this invention, it is possible to provide a solid electrolytic capacitor improved in reliability at high temperature and in characteristics with reduced LC.

BRIEF DESCRIPTION OF THE DRAWINGS

FIGS. 2A and 2B illustrate the solid electrolytic capacitor according to the first embodiment and Example 1 of this invention, wherein FIG. 2A is a perspective view illustrating the overall external appearance thereof and FIG. 2B is an A-A' sectional view thereof;

FIGS. 3A and 3B illustrate a substrate for use in a solid electrolytic capacitor according to a second embodiment and Example 2 of this invention, wherein FIG. 3A is a top view illustrating the capacitor element mounting side thereof and FIG. 3B is a B-B' sectional view thereof;

FIGS. 4A and 4B illustrate a substrate for use in a solid electrolytic capacitor according to a third embodiment and Example 3 of this invention, wherein FIG. 4A is a top view illustrating the capacitor element mounting side thereof and FIG. 4B is a C-C' sectional view thereof; and FIGS. 5A and 5B illustrate a substrate for use in a solid electrolytic capacitor according to Comparative Example 1, wherein FIG. 5A is a top view illustrating the capacitor element mounting side thereof and FIG. 5B is a D-D' sectional view thereof.

DESCRIPTION OF THE EXEMPLARY EMBODIMENTS

First Exemplary Embodiment

A first embodiment of this invention will be described with reference to the drawings.

Figure 1:
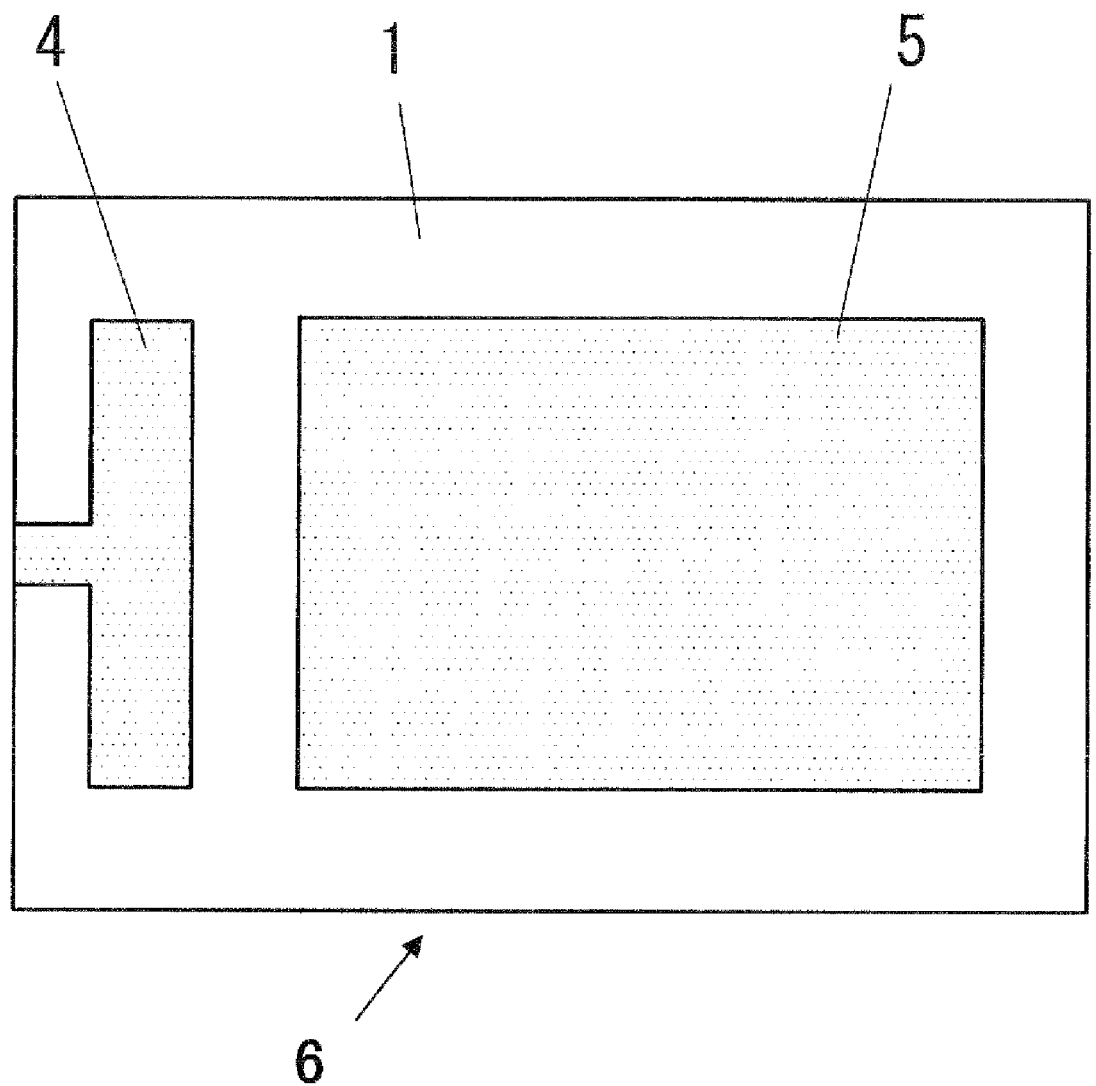
FIG. 1 is a top view illustrating the capacitor element mounting side of a substrate for use in a solid electrolytic capacitor according to a first embodiment and Example 1 of this invention.
Figure 2A:
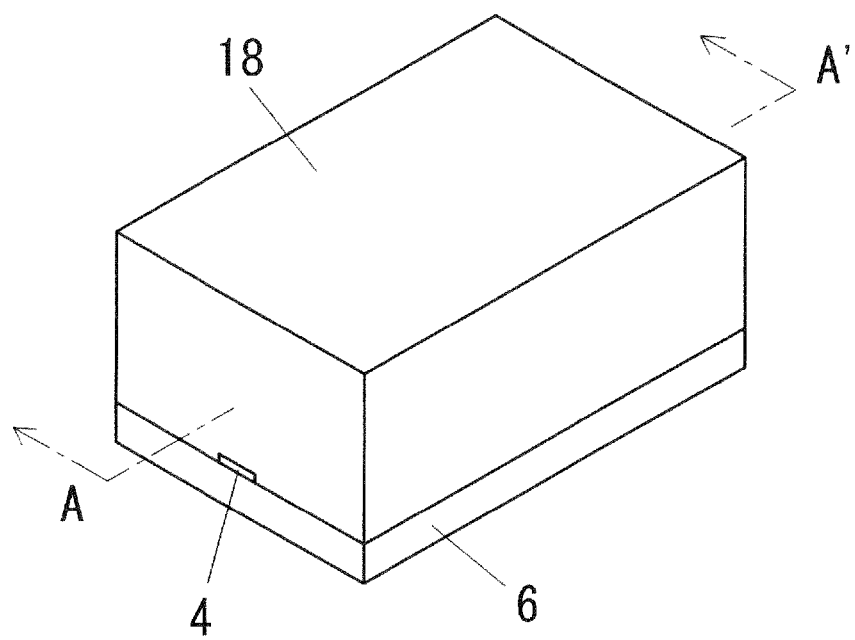
Figure 2B:
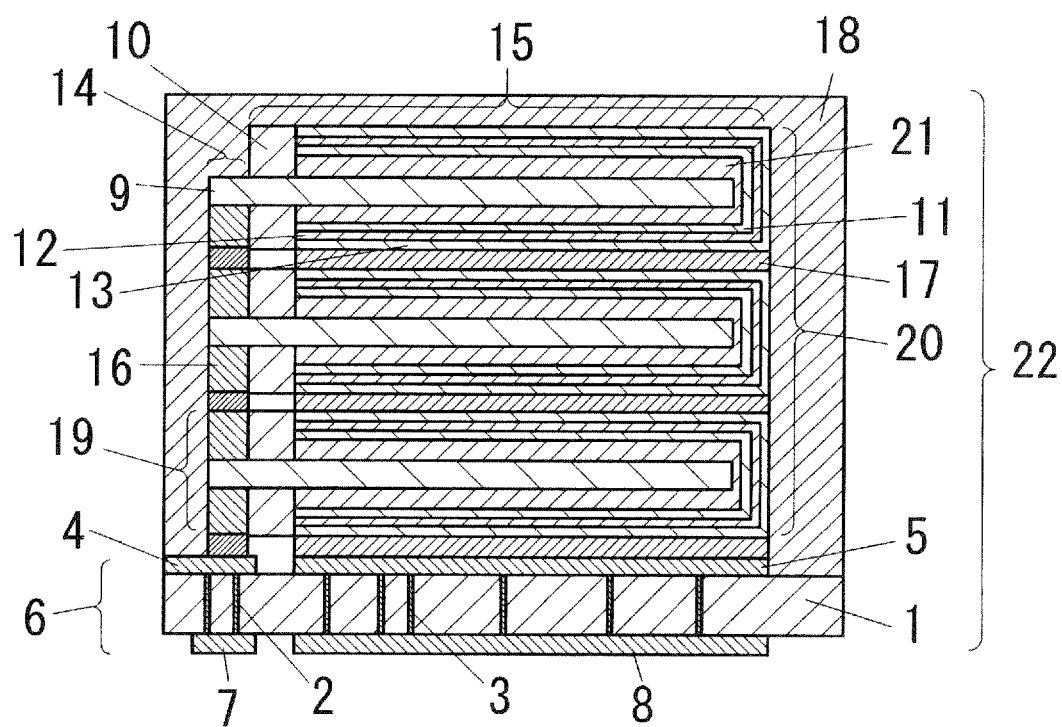

FIG. 1 is a top view illustrating the capacitor element mounting side of a substrate for use in a solid electrolytic capacitor according to this embodiment. In the figure, symbol 1 denotes an insulating layer, 4 an anode mounting portion, and 5 a cathode mounting portion. FIGS. 2A and 2B illustrate the solid electrolytic capacitor according to this embodiment, wherein FIG. 2A is a perspective view illustrating the overall external appearance thereof and FIG. 2B is an exemplary A-A' sectional view thereof.

Referring to FIG. 1 and FIGS. 2A and 2B, a solid electrolytic capacitor 22 comprises a capacitor element laminate 20 composed of a plurality of (three in FIG. 2B) capacitor elements 19, a substrate 6 mounted with the capacitor element laminate 20 thereon, and a packaging resin portion 18 overmolding the capacitor element laminate 20.

Each capacitor element 19 includes a plate-like or foil-like capacitor element base made of aluminum as a valve-metal base material. The capacitor element base is divided into two regions by a resist band (insulating band portion) 10 formed near one end thereof and has an anode portion 9 in one of the regions. In the other region, the capacitor element base is formed with a cathode portion 15. The cathode portion 15 comprises a conductive polymer layer 11, a graphite layer 12, and a silver paste layer 13 formed in this order on a dielectric oxide film layer 21 formed at the base material surfaces. As the dielectric oxide film layer 21, use is made of aluminum oxide formed by anodizing the base material metal. The layers 11 to 13 are formed by coating and curing. The capacitor element laminate 20 is formed by stacking the capacitor elements 19 and fixing them together.

The substrate 6 mounted with the capacitor element laminate 20 thereon is a printed substrate made of, for example, an epoxy resin 1. On the capacitor element laminate mounting surface of the substrate 6, there are formed an anode mounting portion 4 for receiving thereon an anode of the capacitor element laminate 20 and a cathode mounting portion 5 for receiving thereon a cathode of the capacitor element laminate 20. The anode mounting portion 4 and the cathode mounting portion 5 are made of a copper base material. A part of a shape pattern of the anode mounting portion 4 extends to the contour of the substrate 6. The anode mounting portion pattern comprises a rectangular main portion and a rectangular auxiliary portion having a width smaller than that of the main portion, being adjacent to the main portion, and extending from the main portion to the contour of the substrate 6. A shape pattern of the cathode mounting portion 5 is rectangular. The patterns of these mounting portions 4 and 5 are not limited to them.

The mounting portions 4 and 5 are electrically connected to an external anode terminal 7 and an external cathode terminal 8, respectively, formed on the mounting surface of the solid electrolytic capacitor 22, through anode vias 2 and cathode vias 3 (conductive paths formed by filling a conductive material in through holes) each penetrating through the epoxy resin 1. In the state where the capacitor element laminate 20 is fixed on the substrate 6 by a packaging resin, the above part of the anode mounting portion 4 extends to the outside of the packaging resin portion 18.

A vent path for water vapor is formed in a gap between the metal region of the anode mounting portion 4 and the packaging resin portion 18. Specifically, a gap between a portion where the metal region is exposed and the packaging resin at an end portion of the packaging resin serves as an inlet/outlet and a gap between the metal pattern region and the resin forms a path to the inside of the capacitor. This gap includes a bonding state where the bonding strength at the interface between the metal surface and the resin is reduced so that the permeability of water molecules increases. With this vent path, it is possible to allow water vapor to enter through it and thus to allow the capacitor elements to absorb moisture. By performing aging treatment with application of a constant voltage to the solid electrolytic capacitor according to the known method in the state where the capacitor elements contain absorbed moisture, it is possible to reduce leakage current (LC).

The vent path for water vapor provided at the part of the anode mounting portion 4 over the substrate 6 can moderately supply moisture necessary for mending defects of the oxide films in the aging treatment. On the other hand, it is possible to prevent invasion, into the inside of the capacitor, of moisture in an amount that may cause a problem in terms of moisture resistance. As the width of the vent path increases, water vapor can enter the dielectric oxide film layers more easily, but there is a trade-off in terms of the relationship with the reliability.

In this embodiment, the vent path is formed over the substrate 6 made of the part of the anode mounting portion 4 using the copper wiring layer of the substrate and thus the shape of the vent path can be controlled with high accuracy. Although, as shown in FIG. 1, the vent path has a shape extending straight with a constant width, it may have a shape of, for example, a circular arc.

The upper limit width of the vent path can be allowed up to the dimension of the anode mounting portion. However, the reliability tends to decrease for the above reason. With respect to the lower limit width, since it is sufficient that water vapor can enter, the effect of this invention can be obtained even if the width of the vent path is $1/100$ of the dimension of the anode mounting portion. Taking into account both reliability and easiness of entry of moisture into the dielectric oxide films, the width of the part, serving as the vent path, of the anode mounting portion is preferably set to $1/2$ to $1/10$ of the width of the other part of the anode mounting portion.

The material forming the surface of the anode mounting portion 4 is not limited to copper, but may be a metal material containing, as a main component, one of gold, nickel, chromium, tin, silver, and copper.

Second Exemplary Embodiment

Figure 3A:
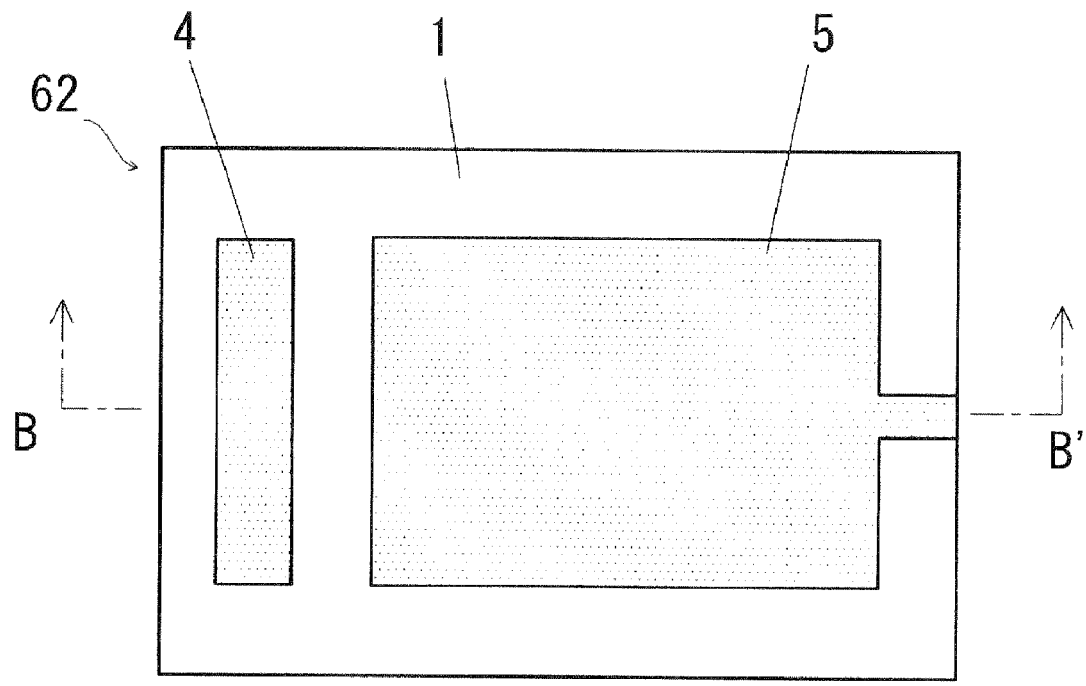
Figure 3B:
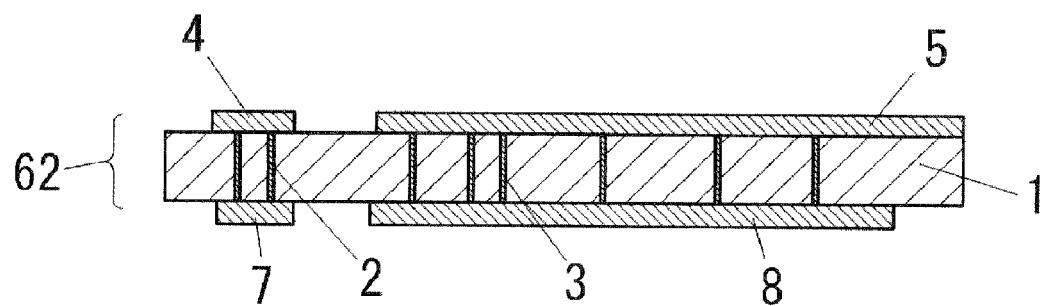

Next, a second embodiment of this invention will be described with reference to the drawings. FIGS. 3A and 3B illustrate a substrate for use in a solid electrolytic capacitor according to this embodiment, wherein FIG. 3A is a top view illustrating the capacitor element mounting side thereof and FIG. 3B is a B-B' sectional view thereof. Although a sectional view of the entire solid electrolytic capacitor corresponding to the substrate of FIGS. 3A and 3B is not presented, only a substrate and a packaging resin portion differ from those in FIG. 2B and a capacitor element laminate is the same as that denoted by symbol 20 in FIG. 2B. In the following description, FIG. 2B will be used for the capacitor element laminate of this embodiment.

In this embodiment, a vent path over the substrate is formed by a part of a cathode mounting portion 5 as shown in FIGS. 3A and 3B.

A solid electrolytic capacitor 22 according to this embodiment comprises, as shown in FIG. 2B, a capacitor element laminate 20 composed of a plurality of (three in FIG. 2B) capacitor elements 19, a substrate 62 (FIGS. 3A and 3B) mounted with the capacitor element laminate 20 thereon, and a packaging resin portion 18 overmolding the capacitor element laminate 20.

Each capacitor element 19 includes a plate-like or foil-like capacitor element base made of aluminum as a valve-metal base material. The capacitor element base is divided into two regions by a resist band (insulating band portion) 10 formed near one end thereof and has an anode portion 9 in one of the regions. In the other region, the capacitor element base is formed with a cathode portion 15. The cathode portion 15 comprises a conductive polymer layer 11, a graphite layer 12, and a silver paste layer 13 formed in this order on a dielectric oxide film layer 21 formed at the base material surfaces. The capacitor element laminate 20 is formed by stacking the capacitor elements 19 and fixing them together.

The substrate 62 mounted with the capacitor element laminate 20 thereon as described above is a printed substrate made of, for example, an epoxy resin. As shown in FIG. 3B, on the capacitor element laminate mounting surface of the substrate 62, there are formed an anode mounting portion 4 for receiving thereon an anode of the capacitor element laminate 20 and a cathode mounting portion 5 for receiving thereon a cathode of the capacitor element laminate 20. The anode mounting portion 4 and the cathode mounting portion 5 are made of a copper base material. The mounting portions 4 and 5 are electrically connected to an external anode terminal 7 and an external cathode terminal 8, respectively, formed on the mounting surface of the solid electrolytic capacitor, through vias each penetrating through the epoxy resin. A part of the cathode mounting portion 5 of the substrate 62 extends to the outside of the packaging resin portion 18.

By providing a vent path for water vapor at the part of the cathode mounting portion 5 over the substrate 62, entry of moisture into the dielectric oxide film layers 21 (FIG. 2B) becomes smoother than that in the first embodiment. However, the moisture resistance, i.e. one element in the reliability, tends to be lower than that in the first embodiment. The reason for the former is that since the position of the vent path is closer to the cathode as compared with that in the first embodiment, the dielectric oxide films are located closer to an inlet/outlet of the vent path formed at an end portion of the packaging resin. On the other hand, as the width of the vent path increases, water vapor can enter the dielectric oxide film layers more easily, but there is a trade-off in terms of the relationship with the reliability. The above relationship becomes more remarkable than that in the first embodiment.

In this embodiment, the vent path is formed over the substrate 62 using the part of the cathode mounting portion 5 made of the copper wiring layer of the substrate and thus the shape of the vent path can be controlled with high accuracy.

Although the shape of the vent path is shown to be linear in FIG. 3A, it may be, for example, a circular arc. The upper limit width of the vent path capable of achieving the effect of this invention can be allowed up to the dimension of the cathode mounting portion. With respect to the lower limit width, since it is sufficient that water vapor can enter, the effect of this invention can be obtained even if the width of the vent path is $1/100$ of the dimension of the cathode mounting portion. Taking into account both reliability and easiness of entry of moisture into the dielectric oxide films, the width of the part, serving as the vent path, of the cathode mounting portion is preferably set to $1/2$ to $1/10$ of the width of the other part of the cathode mounting portion.

The material forming the surface of the cathode mounting portion 5 is not limited to copper, but may be a metal material containing, as a main component, one of gold, nickel, chromium, tin, silver, and copper.

Third Exemplary Embodiment

Figure 4A:
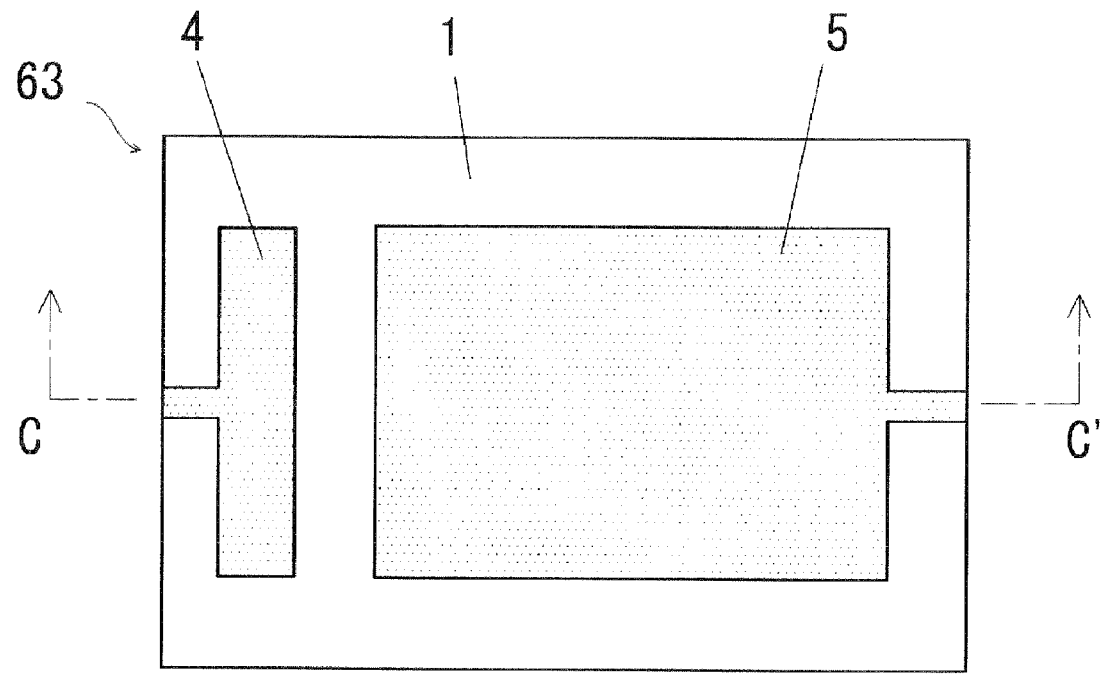
Figure 4B:
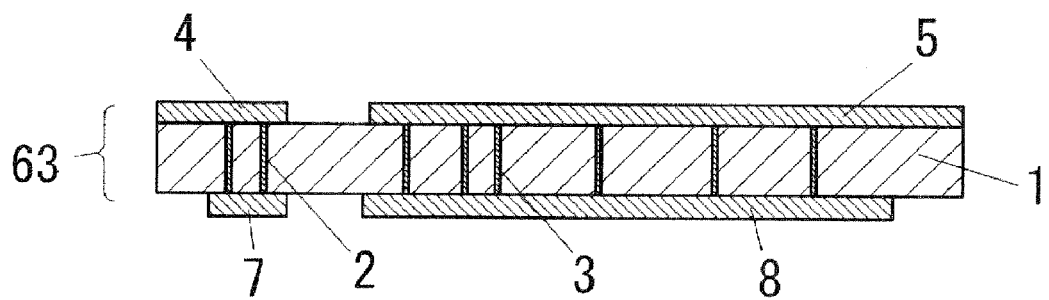

Next, a third embodiment of this invention will be described with reference to the drawings. FIGS. 4A and 4B illustrate a substrate for use in a solid electrolytic capacitor according to this embodiment, wherein FIG. 4A is a top view illustrating the capacitor element mounting side thereof and FIG. 4B is a C-C' sectional view thereof. Although a sectional view of the entire solid electrolytic capacitor corresponding to the substrate of FIGS. 4A and 4B is not presented, vent paths are formed by a part of an anode mounting portion and a part of a cathode mounting portion. Also in this embodiment, a capacitor element laminate is the same as that in FIG. 2B and thus will be described with reference to FIG. 2B.

As shown in FIG. 2B and FIGS. 4A and 4B, a solid electrolytic capacitor 22 according to this embodiment comprises a capacitor element laminate 20 composed of a plurality of (three in FIG. 2B) capacitor elements 19, a substrate 63 mounted with the capacitor element laminate 20 thereon, and a packaging resin portion 18 overmolding the capacitor element laminate 20.

Since each capacitor element 19 is the same as that described in the first embodiment, explanation thereof is omitted.

The substrate 63 mounted with the capacitor element laminate 20 thereon is a printed substrate made of, for example, an epoxy resin. On the capacitor element laminate mounting surface of the substrate 63, there are formed an anode mounting portion 4 for receiving thereon an anode of the capacitor element laminate 20 and a cathode mounting portion 5 for receiving thereon a cathode of the capacitor element laminate 20. The anode mounting portion 4 and the cathode mounting portion 5 are made of a copper base material. The mounting portions 4 and 5 are electrically connected to an external anode terminal 7 and an external cathode terminal 8, respectively, formed on the mounting surface of the solid electrolytic capacitor, through vias each penetrating through the epoxy resin. A part of each of the anode mounting portion 4 and the cathode mounting portion 5 of the substrate 63 extends to the outside of the packaging resin portion 18. That is, the anode mounting portion 4 of the substrate 63 has the same shape as that in the first embodiment, while, the cathode mounting portion 5 of the substrate 63 has the same shape as that in the second embodiment.

By providing a vent path for water vapor at the part of each of the anode mounting portion 4 and the cathode mounting portion 5 over the substrate 63, entry of moisture into dielectric oxide film layers 21 is further accelerated than that in the first and second embodiments. The reason is that the total area of the vent paths becomes greater than the area of the vent path in the first and second embodiments. However, the moisture resistance, i.e. one element in the reliability, tends to be lower than that in the first and second embodiments. As the width of each vent path increases, water vapor can enter the dielectric oxide film layers more easily, but there is a trade-off in terms of the relationship with the reliability.

Therefore, this third embodiment is preferable in terms of a lead time for entry of moisture into the dielectric oxide film layers, while, the first embodiment is preferable in terms of the reliability.

In this embodiment, the vent path is formed over the substrate 63 as the part of each of the anode mounting portion 4 and the cathode mounting portion 5 using the copper wiring layer of the substrate and thus the shape of each vent path can be controlled with high accuracy. Although the shape of each vent path is shown to be linear in FIG. 4A, it may be, for example, a circular arc. The upper limit width of each vent path can be allowed up to the dimension of the anode or cathode mounting portion. However, if it is excessively widened, the reliability tends to decrease. With respect to the lower limit width, since it is sufficient that water vapor can enter, the effect of this invention can be obtained even if the width of each vent path is $1/100$ of the dimension of the anode or cathode mounting portion. Taking into account both reliability and easiness of entry of moisture into the dielectric oxide films, the width of the part, serving as the vent path, of each of the anode and cathode mounting portions is preferably set to $1/2$ to $1/10$ of the width of the other part of the anode or cathode mounting portion.

The material forming the surface of each of the anode and cathode mounting portions 4 and 5 is not limited to copper, but may be a metal material containing, as a main component, one of gold, nickel, chromium, tin, silver, and copper.

This invention is not limited to the foregoing first to third embodiments. For example, aluminum is used as the valve metal base forming the anode portion of each capacitor element 19 in each of the embodiments, but, in stead of aluminum, use may be made of tantalum, niobium, titanium, hafnium, or zirconium as the valve metal base.

Further, the solid electrolytic capacitor in each embodiment is a two-terminal solid electrolytic capacitor having one external anode terminal 7 and one external cathode terminal 8 at the board mounting portion, but this invention is also applicable to a multi-terminal solid electrolytic capacitor having a plurality of external anode terminals and a plurality of external cathode terminals at the board mounting portion. Further, in the solid electrolytic capacitor in each embodiment, the capacitor element laminate is formed by stacking the capacitor elements, but this invention is also applicable to a solid electrolytic capacitor having a single capacitor element. Further, external anode terminals and external cathode terminals on the bottom-side mounting surface of a substrate may be alternately arranged in zigzag at regular intervals.

EXAMPLES

Hereinbelow, solid electrolytic capacitors of this invention will be specifically described in terms of some Examples and Comparative Example.

Example 1

A top view illustrating the capacitor element mounting side of a substrate of a solid electrolytic capacitor of Example 1 is the same as FIG. 1 explained in the first embodiment and an exemplary sectional structure, corresponding to the A-A' plane in FIG. 2A, of the solid electrolytic capacitor of Example 1 is the same as that in FIG. 2B explained in the first embodiment.

At first, a selection was made of a surface-roughened (etched) aluminum foil being on sale for an aluminum electrolytic capacitor, having a thickness of 100 μm and a capacitance of 295 μF/cm$^2$, and requiring an anodization voltage of 4V when forming a dielectric. Then, the selected foil was punched into a shape of a capacitor element. Then, for separating an anode and a cathode, a resist band 10 having a width of 0.8 mm and a thickness of 20 μm was formed of an epoxy resin by screen printing. Then, anodization was performed in an adipic acid aqueous solution to form a dielectric oxide film layer 21. Thereafter, on the dielectric oxide film layer 21 in a cathode forming region, a conductive polymer layer 11 was formed by chemical oxidative polymerization using pyrrole as a monomer, ammonium peroxodisulfate as an oxidant, and paratoluenesulfonic acid as a dopant. On the conductive polymer layer 11, a graphite layer 12 was coated by screen printing and then cured so as to be formed to a thickness of 20 μm. Subsequently, on the graphite layer 12, a silver paste layer 13 was coated by screen printing and then cured so as to be formed to a thickness of 30 μm. Then, a YAG laser beam was irradiated to a region, which should serve as a capacitor element anode portion 14, to thereby expose an anode 9. Then, the anode 9 and a copper-base anode lead frame 16 subjected to nickel, copper, and silver plating were welded together, thereby fabricating a capacitor element 19.

Then, three capacitor elements 19 were stacked together using a conductive adhesive 17, thereby fabricating a capacitor element laminate 20. Then, the capacitor element laminate 20 was connected to a substrate 6.

The substrate 6 is a printed substrate made of an epoxy resin. On the capacitor element laminate mounting surface of the substrate 6, there are formed an anode mounting portion 4 for receiving thereon an anode of the capacitor element laminate 20 and a cathode mounting portion 5 for receiving thereon a cathode of the capacitor element laminate 20. The anode mounting portion 4 and the cathode mounting portion 5 are made of a copper base material. The mounting portions 4 and 5 are electrically connected to an external anode terminal 7 and an external cathode terminal 8, respectively, formed on the mounting surface of a solid electrolytic capacitor 22, through vias each penetrating through the epoxy resin. A part of the anode mounting portion 4 of the substrate 6 extends to the outside of a packaging resin portion 18. The width of the part, extending to the outside of the resin packaging, of the anode mounting portion 4 was set to ⅕ of the width of the other part of the anode mounting portion 4. Thereafter, the resin packaging was performed by transfer molding using an epoxy resin, thereby fabricating the solid electrolytic capacitor 22 of Example 1.

With respect to the electrical characteristics of ten solid electrolytic capacitor samples (samples 1 to 10) thus obtained, the leakage current (LC) values were measured. An LC measuring method is already known. There were prepared an ammeter and a regulated DC power supply that can apply a rated voltage (2.5V) to the obtained solid electrolytic capacitor. The solid electrolytic capacitor was connected according to the polarity of the power supply and the current value after 5 minutes from starting the application of the rated voltage was measured. As a protection circuit, a 2.2 kΩ resistance was connected in series with the ammeter. The results are shown in Table 1.

After the measurement, the ESR (at 100 kHz) was evaluated in time sequence per 500 hours under no load at a high temperature of 125° C. Table 2 shows the average values of change ratios given that the initial value is set to 1.

Example 2

A top view illustrating the capacitor element mounting side of a substrate of a solid electrolytic capacitor of Example 2 is the same as FIG. 3A explained in the second embodiment and its section is the same as that in FIG. 3B. Although the sectional structure of the entire solid electrolytic capacitor of Example 2 corresponding to the substrate illustrated in FIGS. 3A and 3B is not illustrated, a vent path is formed by a part of a cathode mounting portion.

Referring to FIGS. 3A and 3B and FIG. 2B, the solid electrolytic capacitor of Example 2 will be specifically described including its manufacturing process. The manufacturing process of a capacitor element laminate 20 is the same as that in Example 1. Then, the capacitor element laminate 20 was connected to a substrate 62.

The substrate 62 is a printed substrate made of an epoxy resin. On the capacitor element laminate mounting surface of the substrate 62, there are formed an anode mounting portion 4 for receiving thereon an anode of the capacitor element laminate 20 and a cathode mounting portion 5 for receiving thereon a cathode of the capacitor element laminate 20. The anode mounting portion 4 and the cathode mounting portion 5 are made of a copper base material. The mounting portions 4 and 5 are electrically connected to an external anode terminal 7 and an external cathode terminal 8, respectively, formed on the mounting surface of a solid electrolytic capacitor 22, through vias each penetrating through the epoxy resin. A part of the cathode mounting portion 5 on the substrate 62 extends to the outside of a packaging resin portion 18. The width of the part, extending to the outside of the resin packaging, of the cathode mounting portion 5 was set to ⅕ of the width of the other part of the cathode mounting portion 5. Thereafter, the resin packaging was performed by transfer molding using an epoxy resin, thereby fabricating the solid electrolytic capacitor 22 of Example 2.

With respect to the electrical characteristics of ten solid electrolytic capacitor samples thus obtained, the leakage current (LC) values were measured in the same manner as in Example 1. The results are shown in Table 1.

After the measurement, the ESR (at 100 kHz) was evaluated in time sequence per 500 hours under no load at a high temperature of 125° C. Table 2 shows the average values of change ratios given that the initial value is set to 1.

Example 3

A top view illustrating the capacitor element mounting side of a substrate of a solid electrolytic capacitor of Example 3 is the same as FIG. 4A explained in the third embodiment and its section is the same as that in FIG. 4B. Although the sectional structure of the entire solid electrolytic capacitor of Example 3 corresponding to the substrate illustrated in FIGS. 4A and 4B is not illustrated, vent paths are formed by a part of an anode mounting portion and a part of a cathode mounting portion.

Referring to FIGS. 4A and 4B and FIG. 2B, the solid electrolytic capacitor of Example 3 will be specifically described including its manufacturing process. The manufacturing process of a capacitor element laminate 20 is the same as that in Example 1. Then, the capacitor element laminate 20 was connected to a substrate 63.

The substrate 63 is a printed substrate made of an epoxy resin. On the capacitor element laminate mounting surface of the substrate 63, there are formed an anode mounting portion 4 for receiving thereon an anode of the capacitor element laminate 20 and a cathode mounting portion 5 for receiving thereon a cathode of the capacitor element laminate 20. The anode mounting portion 4 and the cathode mounting portion 5 are made of a copper base material. The mounting portions 4 and 5 are electrically connected to an external anode terminal 7 and an external cathode terminal 8, respectively, formed on the mounting surface of a solid electrolytic capacitor 22, through vias each penetrating through the epoxy resin. A part of each of the anode mounting portion 4 and the cathode mounting portion 5 on the substrate 63 extends to the outside of a packaging resin portion 18. The width of the part, extending to the outside of the resin packaging, of each of the anode and cathode mounting portions 4 and 5 was set to 1/5 of the width of the other part of the anode mounting portion 4 (cathode mounting portion 5). Thereafter, the resin packaging was performed by transfer molding using an epoxy resin, thereby fabricating the solid electrolytic capacitor 22 of Example 3.

With respect to the electrical characteristics of ten solid electrolytic capacitor samples thus obtained, the leakage current (LC) values were measured in the same manner as in Example 1. The results are shown in Table 1.

After the measurement, the ESR (at 100 kHz) was evaluated in time sequence per 500 hours under no load at a high temperature of 125° C. Table 2 shows the average values of change ratios given that the initial value is set to 1.

Comparative Example 1

Figure 5A:
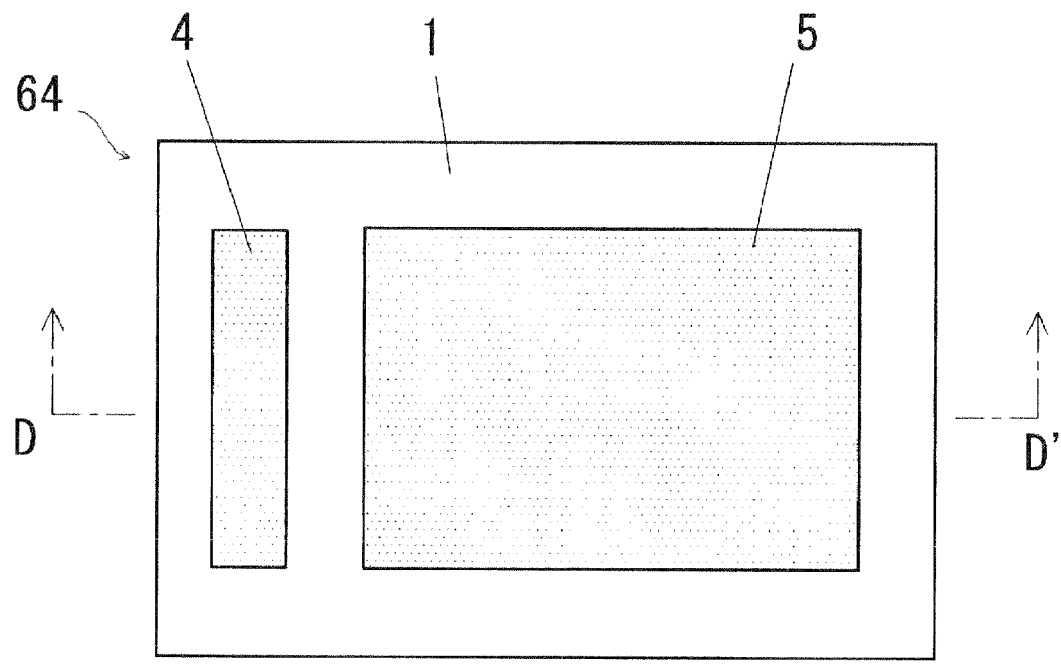
Figure 5B:
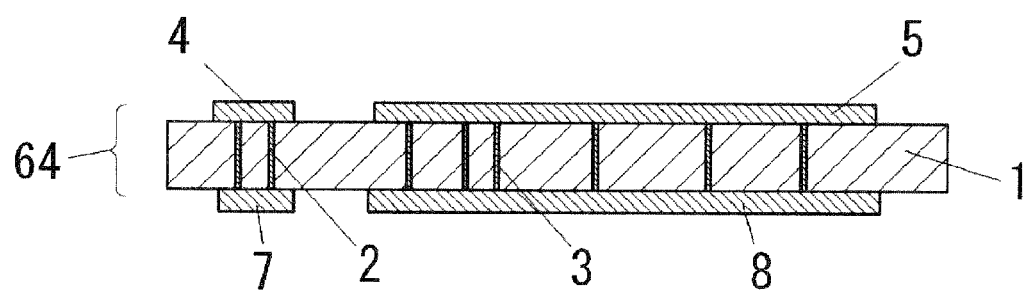

FIGS. 5A and 5B illustrate a substrate for use in a solid electrolytic capacitor according to Comparative Example 1, wherein FIG. 5A is a top view illustrating the capacitor element mounting side thereof and FIG. 5B is a D-D' sectional view thereof. The sectional structure of the entire solid electrolytic capacitor of Comparative Example 1 corresponding to the substrate illustrated in FIGS. 5A and 5B is the same as that in FIG. 2B except a substrate and a packaging resin portion.

Referring to FIGS. 5A and 5B and FIG. 2B, the solid electrolytic capacitor of Comparative Example 1 will be specifically described including its manufacturing process. The manufacturing process of a capacitor element laminate 20 is the same as that in Example 1. Then, the capacitor element laminate 20 was connected to a substrate 64.

The substrate 64 is a printed substrate made of an epoxy resin. On the capacitor element laminate mounting surface of the substrate 64, there are formed an anode mounting portion 4 for receiving thereon an anode of the capacitor element laminate 20 and a cathode mounting portion 5 for receiving thereon a cathode of the capacitor element laminate 20. The anode mounting portion 4 and the cathode mounting portion 5 are made of a copper base material. The mounting portions 4 and 5 are electrically connected to an external anode terminal 7 and an external cathode terminal 8, respectively, formed on the mounting surface of a solid electrolytic capacitor 22, through vias each penetrating through the epoxy resin. However, as different from Examples 1 to 3, neither a part of the anode mounting portion 4 nor a part of the cathode mounting portion 5 on the substrate 64 extends to the outside of a packaging resin portion 18.

Thereafter, the resin packaging was performed by transfer molding using an epoxy resin, thereby fabricating the solid electrolytic capacitor 22 of Comparative Example 1.

With respect to the electrical characteristics of ten solid electrolytic capacitor samples thus obtained, the leakage current (LC) values were measured in the same manner as in Example 1. The results are shown in Table 1.

After the measurement, the ESR (at 100 kHz) was evaluated in time sequence per 500 hours under no load at a high temperature of 125° C. Table 2 shows the average values of change ratios given that the initial value is set to 1.

TABLE 1

|  |  | Sample | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| LC@ | Example 1 | 2.4 | 3.1 | 1.2 | 0.6 | 0.8 | 2.1 | 0.9 | 1.1 | 0.9 | 1.1 |
| 2.5 V-5 min | Example 2 | 0.7 | 0.5 | 1.1 | 1.2 | 0.9 | 0.8 | 1.1 | 1.0 | 0.3 | 0.5 |
| (μA) | Example 3 | 0.1 | 0.2 | 0.1 | 0.2 | 0.3 | 0.1 | 0.1 | 0.3 | 0.2 | 0.1 |
|  | Comparative Example 1 | 55.8 | 50.2 | 63.4 | 50.6 | 66.8 | 63.6 | 59.4 | 60.7 | 69.3 | 51.7 |

As shown in Table 1, the LC value (2.5V-5 min) as low as 1/25 of that in Comparative Example 1 was obtained in Example 1. Further, in Example 2, the LC value (2.5V-5 min) as low as 1/130 of that in Comparative Example 1, which was lower than that in Example 1, was obtained. Further, in Example 3, the LC value (2.5V-5 min) as low as 1/350 of that in Comparative Example 1, which was lower than those in Examples 1 and 2, was obtained.

TABLE 2

|  |  | 500 H | 1000 H | 1500 H | 2000 H |
| --- | --- | --- | --- | --- | --- |
| ESR@100 kHz | Example 1 | 1.0 | 1.1 | 1.4 | 1.6 |
| (times) | Example 2 | 1.2 | 1.4 | 1.7 | 2.0 |
|  | Example 3 | 1.2 | 1.6 | 1.9 | 2.3 |
|  | Comparative Example 1 | 1.6 | 3.6 | 6.4 | 8.2 |

As shown in Table 2, according to the results of the evaluation under no load at a high temperature of 125° C., the evaluation up to 2000 hours exhibited an increase ratio of about twice the initial value in Examples 1 to 3, while, an increase ratio of 8 times or more the initial value in Comparative Example 1.

What is claimed is:

1. A solid electrolytic capacitor in which a capacitor element is mounted on a substrate and covered with a packaging resin,
wherein said capacitor element comprises an anode portion formed by a partial region of a valve metal base, a dielectric layer in the form of an oxide film formed at a roughened surface of said valve metal base and separated from said anode portion by an insulator portion, and a cathode portion including a conductive polymer layer and a conductor layer formed in this order on said dielectric layer, and
a path for water vapor or water molecules leading from the outside to the inside of said solid electrolytic capacitor is formed between said packaging resin and a surface of said substrate.

2. A solid electrolytic capacitor according to claim 1, wherein said path leads to said anode portion of said capacitor element from the outside of said solid electrolytic capacitor through a part of the surface of said substrate.

3. A solid electrolytic capacitor according to claim 2, wherein an anode mounting portion formed on a capacitor element mounting surface of said substrate has at least one portion that is formed to an external end face of said packaging resin and exposed at said external end face.

4. A solid electrolytic capacitor according to claim 3, wherein a surface portion of said anode mounting portion of said substrate is made of a metal material containing, as a main component, one of gold, nickel, chromium, tin, silver, and copper.

5. A solid electrolytic capacitor according to claim 1, wherein said path leads to said cathode portion of said capacitor element from the outside of said solid electrolytic capacitor through a part of the surface of said substrate.

6. A solid electrolytic capacitor according to claim 5, wherein a cathode mounting portion formed on a capacitor element mounting surface of said substrate has at least one portion that is formed to an external end face of said packaging resin and exposed at said external end face.

7. A solid electrolytic capacitor according to claim 6, wherein a surface portion of said cathode mounting portion of said substrate is made of a metal material containing, as a main component, one of gold, nickel, chromium, tin, silver, and copper.

8. A solid electrolytic capacitor according to claim 1, wherein said path comprises a path leading to said anode portion of said capacitor element from the outside of said solid electrolytic capacitor through a part of the surface of said substrate and a path leading to said cathode portion of said capacitor element from the outside of said solid electrolytic capacitor through a part of the surface of said substrate.

9. A solid electrolytic capacitor according to claim 8, wherein an anode mounting portion formed on a capacitor element mounting surface of said substrate has at least one portion that is formed to an external end face of said packaging resin and exposed at said external end face and a cathode mounting portion formed on the capacitor element mounting surface of said substrate has at least one portion that is formed to an external end face of said packaging resin and exposed at said external end face.

10. A solid electrolytic capacitor according to claim 9, wherein a surface portion of said anode mounting portion of said substrate is made of a metal material containing, as a main component, one of gold, nickel, chromium, tin, silver, and copper.

11. A solid electrolytic capacitor according to claim 9, wherein a surface portion of said cathode mounting portion of said substrate is made of a metal material containing, as a main component, one of gold, nickel, chromium, tin, silver, and copper.

12. A solid electrolytic capacitor according to claim 1, wherein said valve metal base is made of one of aluminum, tantalum, niobium, titanium, hafnium, and zirconium.

* * * * *